United States Patent
Waggoner

(10) Patent No.: US 6,492,463 B1
(45) Date of Patent: *Dec. 10, 2002

(54) LIQUID CRYSTALLINE POLYMER COMPOSITION

(75) Inventor: Marion Glen Waggoner, Hockessin, DE (US)

(73) Assignee: E. I. du Pont de Nemours and Company, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,009

(22) Filed: Jul. 7, 1998

Related U.S. Application Data

(63) Continuation-in-part of application No. 08/891,880, filed on Jul. 9, 1997, now abandoned, which is a continuation of application No. 08/628,116, filed on Apr. 4, 1996, now abandoned, which is a continuation of application No. 08/298,992, filed on Aug. 31, 1994, now abandoned.

(51) Int. Cl.[7] ............................. C08L 67/03; C08L 67/04
(52) U.S. Cl. ...................... 525/132; 525/426; 525/445; 525/450; 524/275; 524/277; 524/279; 524/513; 524/514
(58) Field of Search ................................. 525/132, 426, 525/445, 450; 524/513, 514, 275, 277, 279

(56) References Cited

U.S. PATENT DOCUMENTS

| | | | |
|---|---|---|---|
| 4,085,088 A | 4/1978 | Miyata et al. | 260/45.7 R |
| 5,110,896 A | 5/1992 | Waggoner et al. | 528/190 |
| 5,221,705 A | 6/1993 | Inoue et al. | 524/120 |
| 5,525,700 A | 6/1996 | Samuels et al. | 528/190 |

FOREIGN PATENT DOCUMENTS

JP  1-292-057  11/1989

*Primary Examiner*—Patricia A. Short

(57) ABSTRACT

A composition comprising a thermotropic liquid crystalline polymer (LCP) and small quantities of low molecular weight polyethylene (PE) is disclosed. The PP acts as an internal lubricant or mold release, but suprisingly does not significantly increase the flammability of the LCP.

29 Claims, No Drawings

LIQUID CRYSTALLINE POLYMER COMPOSITION

This application is a continuation-in-part of prior application Ser. No. 08/891,880 filed on Jul. 9, 1997, now abandoned; which was a continuation of application Ser. No. 08/628,116 filed on Apr. 4, 1996, now abandoned; which was a continuation of application Ser. No. 08/298,992 filed on Aug. 31, 1994, now abandoned.

FIELD OF THE INVENTION

The present invention relates to a composition comprising an aromatic liquid crystalline polymer (LCP) and a low molecular weight polyethylene (PE) which acts as a lubricant.

TECHNICAL BACKGROUND

Thermotropic liquid crystalline polymers are useful as molding resins for a variety of applications. This is due to the desirable properties that many of these polymers possess, such as good moldability, low flammability, high temperature resistance, good physical properties, etc. For electrical applications, such as electrical connectors, low flammability or resistance to burning is important. Further, in many electrical applications, the parts are intricate and have thin walls. As such, these parts are sometimes difficult to eject from the mold. Internal lubricants (sometimes called mold release agents) are useful to aid in the ejection of such parts from the mold. For a discussion of such lubricants, see H. Mark, et al., Ed., Encyclopedia of Polymer Science and Engineering, Vol. 14, John Wiley & Sons, New York, 1988, p. 411–421.

While internal lubricants are generally desirable in many applications, it is preferable that the desired properties of the LCP are degraded as little as possible. It has been surprisingly found that low molecular weight polyethylene (often called a "wax") which by itself burns quite readily, when added to an LCP as a lubricant, does not significantly degrade the low flammability properties of the LCP.

SUMMARY OF THE INVENTION

This invention relates to a composition comprising: a) an aromatic liquid crystalline polymer, and b) from about 0.05 to about 2.5 percent by weight of said aromatic liquid crystaline polymer of polyethylene, said polyethylene having a molecular weight within the range between about 1,000 to about 10,000.

DETAILS OF THE INVENTION

The LCPs useful herein are aromatic LCPs. By an "aromatic" LCP is meant that the backbone of the polymer is composed of aromatic rings and functional groups such as esters, amides and imides. There are no aliphatic or cycloaliphatic groups which are part of the main chain. However, such groups may be substituted onto the main chain as side groups. For instance, in an LCP which is at least partially a polyester, repeat units may be derived from t-butylhydroquinone, methylhydroquinone, phenethyihydroquinone, methylterephthic acid, t-butyl-4-hydroxybenzoic acid, etc.

Preferred aromatic LCPs are polyesters, poly(imide-esters) and poly(amide-esters), with polyesters being especially preferred. These types of polymers are well known to the artisan, see for instane U.S. Pat. Nos. 4,900,804, 4,851, 497, 4,067,852, 4,083,832, 4,727,131, 4,727,129, 4,762,907, 4,664,972, 4,118,372, 4,684,712, 4,522,974, 4,473,682 4,161,470 and 5,110,896. Preferred LCPs may contain repeat units derived from one or more of 4-hydroxybenzoic acid, 6-hydroxynapthoic acid, terephthalic acid, isophthalic acid, 2,6-naphthalene dicarboxylic acid, 4,4'-bibenzoic acid, hydroquinone, 4,4-biphenol, resorcinol, 2,6-dihydroxynaphthalene, substituted hydroquinones including chlorohydroquinone, methylhydroquinone, t-butylhydroquinone, phenylhydroquinone, and phenethyl-hydroquinone. Especially preferred polymers include polymers consisting essentially of:

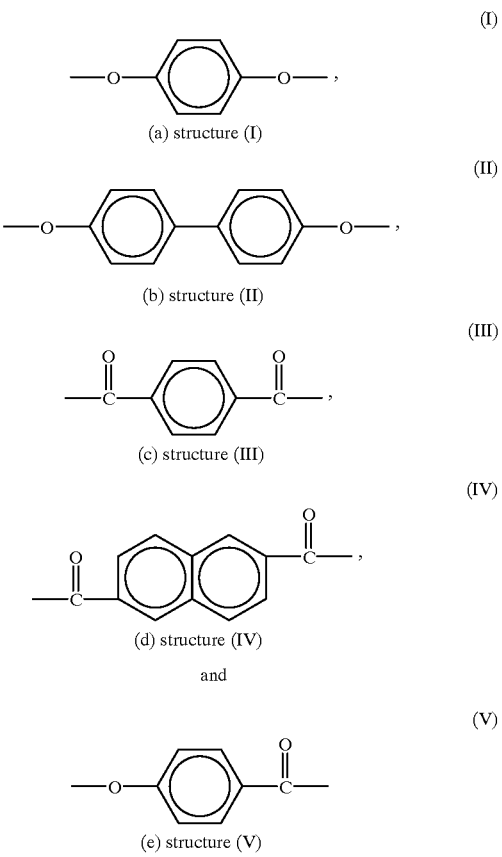

wherein the molar ratio of(I):(II) ranges from 0:100 to 100:0, wherein the molar ratio of (III):(IV) ranges from 85:15 to 15:85, wherein the molar ratio of the total of (I) and (II) to the total of (III) and (IV) is substantially 1:1, and further wherein there are 100 to 600 moles of (V) per 100 moles of (I) plus (II);

or polymers consisting essentially of the following repeat units:

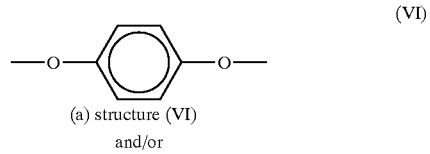

and/or

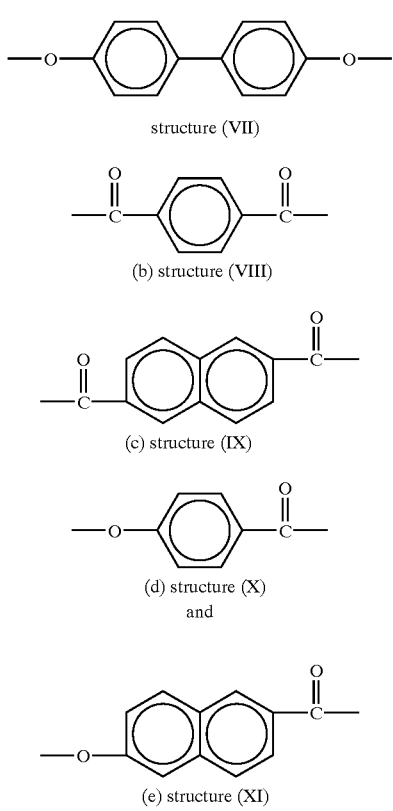

wherein the molar ratio of (VI):(VII) ranges from 0:100 to 100:0, the molar ratio of (VIII):(IX) rages from 25:75 to 90:10, the molar ratio of the sum of (VI) and (VII) to the sum of (VIII) and (IX) is substantially 1:1, the molar ratio of (X):XI) ranges from 97:3 to 50:50, and the number of moles of (X) plus (XI) ranges from 100 to 600 per moles of (VI) plus (VII).

Especially preferred polymers also include copolymers of p-hydroxybenzoic acid and 6-hydroxynapthoic acid.

The polyethylene ("PE") useful herein has a molecular weight within the range between about 1,000 to about 10,000, and preferably about 1,500 to about 4,000. Low pressure polymerized (high density), polar PE is preferred for use in the present invention. Such PEs are made by oxidation of PE which introduces polar functional groups, such as carboxyl groups, into the PE. Such oxidized PEs are commercially available, such as those from Hoechst Celanese Corp., Somerville, N.J., U.S.A. under the designation "Hoechst Wax PED."

The amount of PE present in the present invention generally ranges from about 0.05 to about 2.5 percent by weight of the LCP, preferably about 0.1 to about 2.0 percent by weight, and most preferably about 0.2 to about 1.0 percent by weight. Other materials usually found in LCP molding compositions may also be present, such as fillers, including glass, clay, talc and other minerals, and carbon black, pigments, antioxidants, other polymers, etc. Preferred fillers are glass fiber, talc, titanium dioxide and carbon black, and an especially preferred filler is glass fiber.

Flammability or flame resistance properties reported herein were measured by UL-94, revised as of May 14, 1993, and published by Underwriters Laboratories, Inc., Melville, N.Y., U.S.A. It is preferred that the flammability (as measured by the total after flame time for any condition set) of the LCP compositions not containing PE is increased by less than 50% when the PE is added, more preferably less than 25%, and especially preferably increased less than 10%.

It is also preferred that the overall UL-94 rating under the particular test conditions used is the same or better (less flammable rating) for the PE containing LCP composition compared to the LCP composition without PE. It is particularly preferred if the PE containing LCP composition still retains a UL-94 rating of V-0.

The PE containing LCP compositions claimed herein may be made by standard methods. For instance these materials (and others to be in the composition) may be mixed together in a single or twin screw extruder. The composition may be then directly melt formed or formed into pellets for later use. Melt forming may be done by extrusion or injection molding, for example, and the latter is preferred. Such formed parts are useful as films, or as molded parts in the automotive, electronic or aerospace applications. As mentioned above, the composition is particularly usefull for electronic parts, particularly electronic connectors.

In the Examples, the starting LCP used in had a composition of: (structures shown above, in mole percent) (I), 9.6%; (II), 9.6%; (III), 13.5%; (IV), 5.8%; and (V), 61.5% (see U.S. Pat. No. 5,110,896). The fiberglass used in the Examples was grade 408 from Owens-Corning Fiberglass Corp. The polyethylene was reported to be an oxidized low pressure polyethylene, from Hoechst Celanese Corp., Somerville, N.J., U.S.A. as grade PED 521. It reportedly had a drop point of about 105° C., an acid value of about 35 mg KOH/g and a density of about 0.95 at 20° C., using test methods specified by Hoechst Celanese Corp.

The materials were mixed on a Werner and Pfleiderer 28 mm twin screw extruder, in which the zone temperatures (rear to front) were approximately 255° C., 290° C., 290° C., 290° C., 300° C. and 345° C. (die). A one-hole die was used, and pellets were made. The pellets were then injection molded into test bars for the Flammability test with temperatures in the injection molding machine (rear to front) being approximately 325° C., 320° C., 330° C., 335° C., and 347 ° C.

Mold-release Test

Examples 1–4

In this example set, four LCP compositions were molded, three containing low molecular weight PE and one Comparative Example B not containing any PE. The talc used was Supra® Talc from Cyprus Minerals, and the carbon black used was Velvetine® carbon black. The compositions are given in Table 1, where the weight percents are based on the totals of all components of the compositions.

Electrical connectors were injection molded of each sample. The sample in Control example 1 had a minimum cycle time of 19 sec, and the part was deformed by the ejector pin when ejected. On the contrary, the samples in examples 2 and 3 both had minimum cycle times of 14.9 sec with no deformation from the ejector pin. Similarly, the sample in example 4 had a minimum cycle time of 15.9 sec and showed no deformation caused by the ejector pin. These particular results, with electrical connector samples surprisingly showing no deformation from the ejector pin, illustrate the improved mold release properties when PE was present.

TABLE 1

| Sample | % LCP | % PE | % Fiberglass | % Carbon Black | % Talc |
|---|---|---|---|---|---|
| Control 1 | 70 | 0 | 30 | 0 | 0 |
| 2 | 69.5 | 0.5 | 30 | 0 | 0 |
| 3 | 69 | 1.0 | 30 | 0 | 0 |
| 4a | 61.5 | 0.5 | 23.3 | 1.3 | 13.3 |

Flammability Test

EXAMPLE 5–8

For examples 5–8, the same LCP, PE, and glass was used as in Examples 1–4. Compositions (weight percents are based on totals of all components in the compositions), tensile strengths and elongations, and UL-94 burn times and overall ratings are given in Table 1, along with values for Comparative Example 5 which contained no PE. Tensile properties were determined with bars that were 0.318 mm (⅛") thick. Tensile tests were performed according to ASTM D638.

UL-94 tests were determined with bars that were 0.079 mm (1/32") thick, with the burns being done on dry and as-molded bars. Given the propensity of PE to burn, it was surprising to see to see that the test bars containing PE still unexpectedly retain a V-0 UL-94 rating.

TABLE 2

| Example | wt % PE | wt % Fiberglass | Tensile Strength (MPa) | Elong. % | Burn Time (sec) | UL-94 Rating |
|---|---|---|---|---|---|---|
| Control 5 | 0.0 | 30 | 116 | 2.8 | 25 | V-0 |
| 6 | 0.5 | 30 | 107 | 3.0 | 26 | V-0 |
| 7 | 1.0 | 30 | 106 | 3.0 | 24 | V-0 |
| 8 | 1.5 | 30 | 103 | 2.9 | 25 | V-0 |

While this invention has been described with respect to various examples and embodiments, it is to be understood that the invention is not limited thereto and that it can be variously practiced within the scope of the following claims.

What is claimed is:

1. A composition comprising:
   (a) a thermotropic aromatic liquid crystalline polymer; and
   (b) from 0.05 to 2.5 percent by weight of said aromatic liquid crystalline polymer of polyethylene. said polyethylene having a molecular weight within the range between 1,000 to 10,000; and
   (c) optionally additional components including fillers, pigments and antioxidants,
   wherein said composition, noth with and without said polyethylene, has a flammability rating of V-O under the test conditions of UL-94 at a bar thickness of 0.079 mm (1/32 inch).

2. The composition of claim 1, wherein said polyethylene has a molecular weight within the range between 1,500 to 4,000.

3. The composition of claim 1, wherein said polyethylene is polar.

4. The composition of claim 3, wherein said polyethylene is made by low pressure polymerization.

5. The composition of claim 4, wherein said polyethylene is about 0.2 to 1.0 percent by weight of said aromatic liquid crystalline polymer.

6. The composition of claim 5, wherein said aromatic liquid crystalline polymers contains repeat units derived from one or more of 4-hydroxybenzoic acid, 6-hydroxynapthoic acid, terephthalic acid, isophthalic acid, 2,6-naphthalene dicarboxylic acid, 4,4'-bibenzoic acid, hydroquinone, chlorohydroquinone, methylhydroquinone, t-butylhydroquinone, phenylhydroquinone, phenethylhydroquinone, 4,4-biphenol, resorcinol, or 2,6-dihydroxynaphthalene.

7. The composition of claim 5, wherein said aromatic liquid crystalline polymer consists essentially of the repeat units:

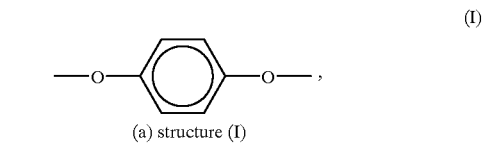

(a) structure (I)

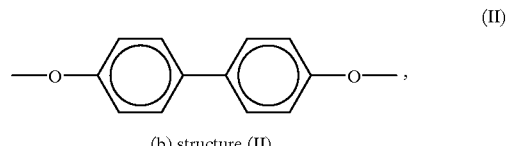

(b) structure (II)

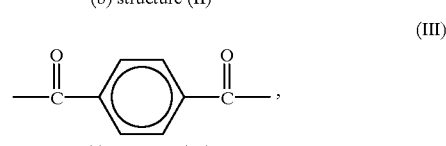

(c) structure (III)

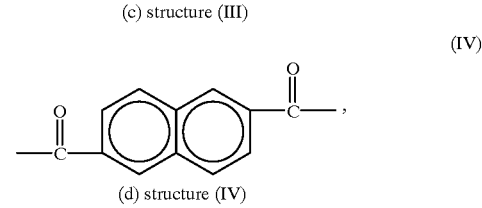

(d) structure (IV)

and

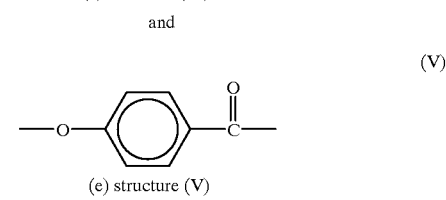

(e) structure (V)

wherein the molar ratio of (I):(II) ranges from 0:100 to 100.0, wherein the molar ratio of (III):(IV) ranges from 85.15 to 15.85, wherein the molar ratio of the total (I) and (II) to the total of (III) and (IV) is substantially 1:1, and further wherein there are 100 to 600 moles of (V) per 100 moles of (I) plus (II).

8. The composition of claim 5, wherein said aromatic liquid crystalline polymer consists essentially of the repeat units:

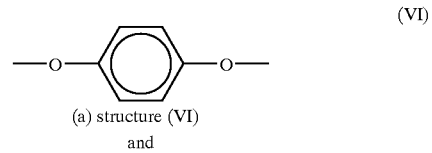

(a) structure (VI)

and structure (VII)
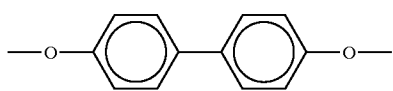
(VII)

(b) structure (VIII)
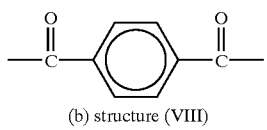
(VIII)

(c) structure (IX)
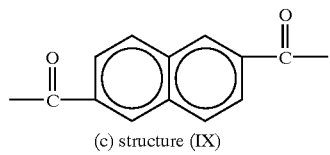
(IX)

(d) structure (X)
and
(X)

(e) structure (XI)
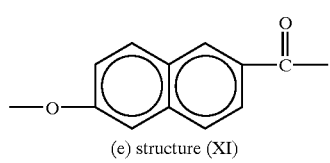
(XI)

wherein the molar ratio of (VI):(VII) ranges from 0:100 to 100.0, wherein the molar ratio of (VIII):(IX) ranges from 25.75 to 90.10, the molar ratio of the sum of (VI) and (VII) to the sum of (VIII) and (IX) is substantially 1:1, the molar ratio of (X):(XI) ranges from 97:3 to 50:50, and the number of moles (X) plus (XI) ranges from 100 to 600 moles of (VI) plus (VII).

9. The composition of claim 1, wherein said polyethylene is about 0.1 to 2.0 percent by weight of said aromatic liquid crystalline polymer.

10. The composition of claim 1, wherein said aromatic liquid crystalline polymer contains repeat units derived from one or more of 4-hydroxybenzoic acid, 6- hydroxynapthoic acid, terephthalic acid, isophthalic acid, 2,6-naphthalene dicarboxylic acid, 4,4'-bibenzoic acid, hydroquinone, chlorohydroquinone, methylhydroquinone, t-butylhydroquinone, phenylhydroquinone, phenethylhydroquinone, 4,4-biphenol, resorcinol, or 2,6-dihydroxynaphthalene.

11. The composition of claim 1, wherein said aromatic liquid crystalline polymer consists essentially of the repeat units:

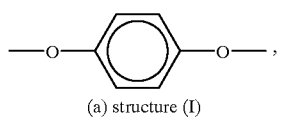
(a) structure (I)
(I)

(b) structure (II)
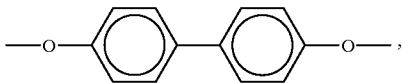
(II)

(c) structure (III)
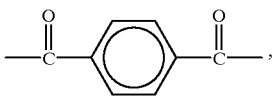
(III)

(d) structure (IV)
and
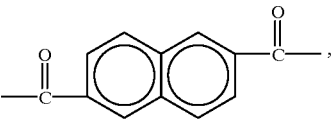
(IV)

(e) structure (V)
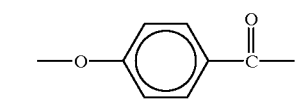
(V)

wherein the molar ratio of (I):(II) ranges from 0:100 to 100:0, wherein the molar ratio of (III):(IV) ranges from 85.15 to 15:85, wherein the molar ratio of the total of (I) and (II) to the total of (III) and (IV) is substantially 1:1, and further wherein there are 100 to 600 moles of (V) per 100 moles of (I) plus (II);

12. The composition of claim 1, wherein said aromatic liquid crystalline polymer consists essentially of repeat units:

(a) structure (VI)
and
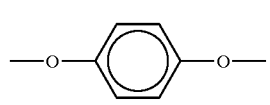
(VI)

structure (VII)
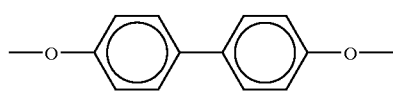
(VII)

(b) structure (VIII)
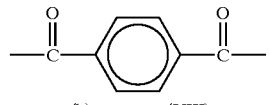
(VIII)

(c) structure (IX)
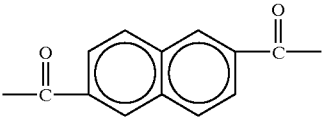
(IX)

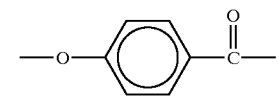

(d) structure (X)

and

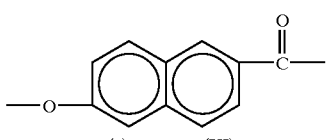

(e) structure (XI)

wherein the molar ratio of (VI):(VII) ranges from 0:100 to 100:0, the molar ratio of (VIII):(XI) ranges from 25.75 to 90:10, the molar ratio of the sum of (VI) and (VII) to the sum of (VIII) and (XI) is substantially 1:1, the molar ratio of (X):(XI) ranges from 100 to 600 per moles of (VI) plus (VII);

13. The composition of claim 1, wherein said aromatic liquid crystalline polymer is selected from the group consisting of a polyester, a poly(imide-ester) and a poly(amide-ester).

14. The composition of claim 1, wherein glass fiber is present as said filler.

15. The composition of claim 1, wherein said filler is selected from the group consisting of glass fiber, carbon black, titanium dioxide, talc and combinations thereof.

16. The composition of claim 1, wherein said aromatic liquid crystalline polymer is a poltester.

17. A composition consisting essentially of:
   a) thermotropic aromatic liquid crystalline polymer; and
   b) from 0.05 to 2.5 percent by weight of said liquid crystalline polymer of polyethylene, said polyethylene having a molecular weight within the range between 1,000 to 10,000; and
   c) optionally additional components consisting essentially of fillers, pigments and antioxidants,
   wherein said composition, both with and without said polyethylene, has a flammability rating of V-O under the test conditions of UL-94 at a bar thickness of 0.079 mm (1/32 inch).

18. The composition of claim 17, wherein said polyethylene has a molecular weight within the range between 1,500 to 4,000.

19. The composition of claim 17, wherein said polyethylene is polar.

20. The composition of claim 17, wherein said polyethylene is about 0.1 to 2.0 percent by weight of said aromatic liquid crystalline polymer.

21. The composition of claim 20, wherein said polyethylene is about 0.2 to 1.0 percent by weight of said aromatic liquid crystalline polymer.

22. The composition of claim 17, wherein said liquid crystalline polymer is selected from the group consisting of a polyester, a poly(imide-ester) and a poly(amide-ester).

23. The composition of claim 22, wherein said filler is selected from the group consisting of glass fiber, carbon black, titanium dioxide, talc and combinations thereof.

24. A composition comprising:
   a) a thermotropic aromatic liquid crystalline polymer having a flammability rating of V-O under the test conditions of UL-94, as revides on May 14, 1993, at a bar thickness of 0.079 mm (1/32 inch); and
   b) from 0.05 to 2.5 percent by weight of said aromatic liquid crystalline polymer of polyethylene, and wherein:
      i) said polyethylene having a molecular weight within the range between 1,000 to 10,000;
      ii) said composition may optionally contain additional components including fillers, pigments and antioxidants; and
      iii) said composition ratains the UL-94 flammability rating of V-O.

25. The composition as recited in claim 24, wherein said polyethylene has a molecular weight within the range between 1,500 to 4,000.

26. The composition as recited in claim 24, wherein said polyethylene is polar.

27. The composition as recited in claim 24, wherein the amount of said polyethylene is about 0.1 to 2.0 percent by weight of said aromatic liquid crystalline polymer.

28. The composition as recited in claim 24, wherein said aromatic liquid crystalline polymer is selected from the group consisting of a polyester, a poly(imide-ester) and a poly(amide-ester).

29. The composition as recited in claim 24 said filler is selected from the group consisting of glass fiber, carbon black, titanium dioxide, talc and combinations thereof.

* * * * *